United States Patent [19]
Winder

[11] Patent Number: 5,125,536
[45] Date of Patent: Jun. 30, 1992

[54] FLUID TRANSFERRING DEVICE WITH MOVEABLE CUTTER

[76] Inventor: D. H. Winder, 25 Wendell Ave., Weston, Ontario, Canada, M9N 3K6

[21] Appl. No.: 709,518

[22] Filed: Jun. 3, 1991

[51] Int. Cl.⁵ .............................................. B67B 7/24
[52] U.S. Cl. .................................... 222/83.5; 222/88; 222/105; 141/330; 141/364
[58] Field of Search ....................................... 222/81–88, 222/105, 107; 141/65, 329, 330, 364

[56] References Cited

U.S. PATENT DOCUMENTS

| | | |
|---|---|---|
| 2,083,479 | 6/1937 | Speare . |
| 2,350,836 | 6/1944 | Sonneborn ............................ 222/84 |
| 2,602,483 | 7/1952 | Graham ............................ 222/87 X |
| 3,193,145 | 7/1965 | Vara, Sr. ............................ 222/86 X |
| 3,288,178 | 11/1966 | Johnson . |
| 3,348,738 | 10/1967 | Hertlein ................................ 222/88 |
| 3,724,721 | 4/1973 | Barr ................................ 222/88 X |
| 4,265,372 | 5/1981 | Wainberg ............................ 222/85 X |
| 4,316,555 | 2/1982 | Smith ................................ 222/83.5 |
| 4,322,019 | 3/1982 | Smith ................................ 222/83.5 |
| 4,332,334 | 6/1982 | Mian ................................ 222/83.5 |
| 4,557,825 | 12/1985 | Wittes et al. ...................... 222/88 X |
| 4,638,926 | 1/1987 | Brock ................................ 222/82 |
| 4,676,281 | 6/1987 | Nord . |

Primary Examiner—Michael S. Huppert
Assistant Examiner—Kenneth DeRosa
Attorney, Agent, or Firm—Bereskin & Parr

[57] ABSTRACT

A device for assisting in the transfer of fluid from a bag into a fluid reservoir. The device includes a generally upstanding container dimensioned to receive the fluid bag. The container has an open top and fluidly communicates with the interior of a reservoir. A bag support extends across the container in a non-fluidly sealed manner. A cutter is connected by a linkage to a lid of the device to move with the lid as the lid is closed and cut the bag.

11 Claims, 3 Drawing Sheets

FLUID TRANSFERRING DEVICE WITH MOVEABLE CUTTER

FIELD OF THE INVENTION

This invention relates to devices for assisting in the transfer of fluid from a bag into a fluid reservoir.

BACKGROUND OF THE INVENTION

Most automobiles have a windshield washer system which dispenses a fluid from a fluid reservoir through a jet onto the windshield. When it is expected that the vehicle will be operated in below freezing conditions, the fluid reservoir for the windshield washing system is generally filled with an alcohol solution referred to as "windshield washer fluid" which will not freeze if sprayed onto a cold windshield. Windshield washer fluid has up to now generally been sold in plastic bottles of approximately 4 liters capacity.

A typical windshield washer fluid reservoir has an opening of approximately two inches diameter which makes filling somewhat difficult in view of the size of typical windshield washer fluid bottles. The filling of windshield washer fluid reservoirs is further complicated by the fact that they are generally located in the engine compartment of an automobile and are surrounded by various structures that prevent the windshield washer fluid bottle from being placed close to the filling opening of the reservoir.

It is an object of the present invention to provide a structure or assembly which facilitates the filling of a windshield washer fluid reservoir.

It is a further object of the present invention to provide such a structure or assembly which accepts windshield washer fluid in plastic bags.

It is a still further object of the present invention to provide such a structure which is relatively easy to operate.

SUMMARY OF THE INVENTION

A device for transferring fluid from a bag placed therein into a fluid reservoir, said device comprising:

a generally upstanding container having walls defining an interior space dimensioned to receive said bag, said container having a top opening and fluidly communicating with the interior of said reservoir;

said walls including a fluid permeable bag support extending across said container below said top;

a lid hingedly connected to said container for closing said top opening;

a moveable cutter; and, a linkage connecting said lid to said cutter to move said cutter to an inactive position towards one of said walls as said lid is opened and to move said cutter through said interior space for said cutter to move through a face of said bag as said lid is closed to pierce said bag and allow fluid from said bag to escape from said bag and flow past said bag support into said fluid reservoir.

DESCRIPTION OF THE DRAWINGS

Preferred embodiments of the present invention are described in detail below with reference to the attached drawings in which.

DETAILED DESCRIPTION OF THE PREFERRED EMBODIMENTS

Figure 1:
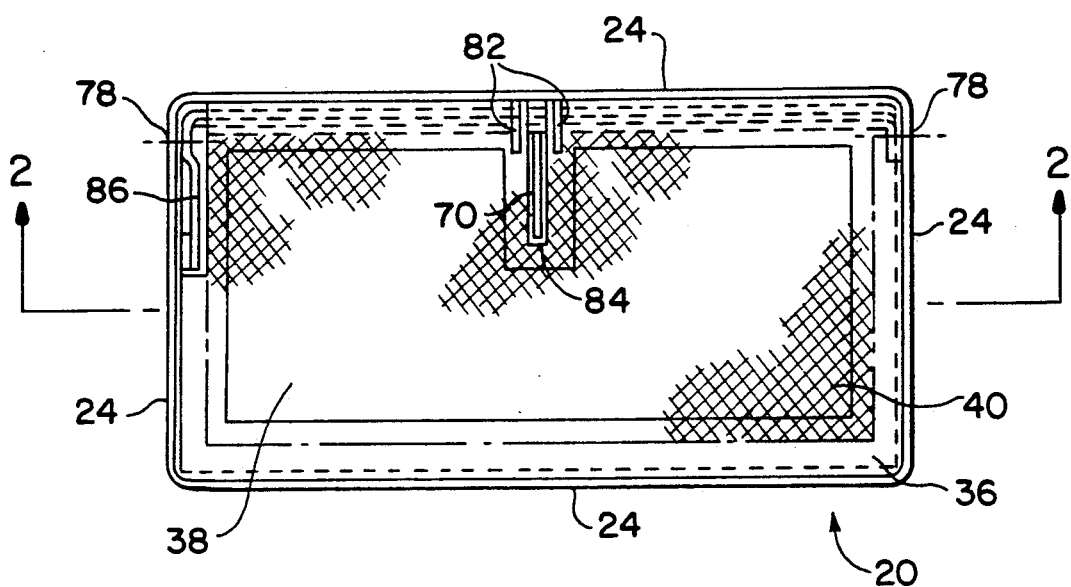
FIG. 1 is a top plan view of a device according to the present invention with the lid removed.
Figure 2:
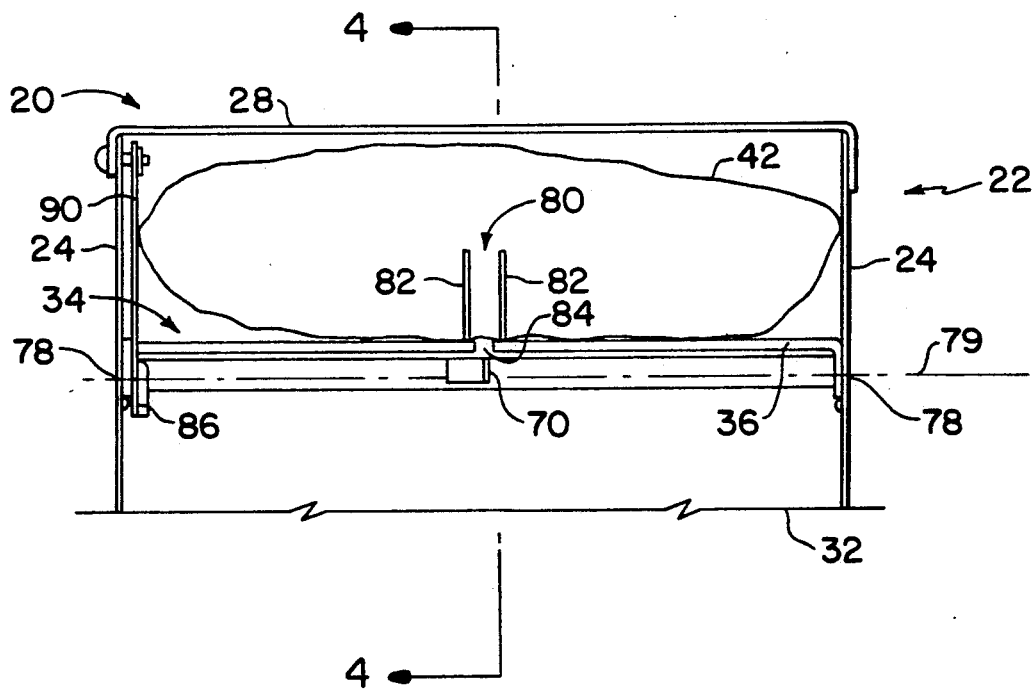
FIG. 2 is a view on line 2—2 of FIG. 1 of a structure according to the present invention with the lid in place.

A first embodiment of a device 20 according to the present invention is illustrated in FIGS. 1 through 5. The device 20 includes a generally upstanding container 22 which is defined in part by four opposed sidewalls 24. The container 22 has an open top 26 which is coverable by a lid 28 shown in FIGS. 2 through 5 but omitted from FIG. 1 for clarity. The lid 28 is attached to one of the sides 24 by a hinge 30 which extends along the side 24. A fluid reservoir (not shown) would be provided beneath the bottom 32 of the container 22.

A device 20 according to the present invention may be formed as part of a fluid reservoir or may be connected to a remote fluid reservoir through a suitable conduit.

A bag support 34 extends across the container 22 below the top 26. The bag support 34 includes a generally rectangular frame 36 which runs along the sidewalls 24 of the container 22 and defines a generally rectangular opening 38 in FIG. 1. A screen 40 supported by the frame 36 extends across the rectangular opening 38. The bag support 34 provides a structure on which a bag 42 in FIGS. 2 through 5 may be placed within the upper part of the container 22. The presence of the screen 40 over the rectangular opening 38 renders the bag support fluid permeable.

The device 20 includes a moveable cutter 70. The cutter 70 has a curved blade 72 and tapers toward a point 74. The cutter 70 is mounted on a shaft 76 which is pinned to opposite sides 24 of the container 22 at 78 so as to be rotatable about an axis 79 extending along its length. The shaft 78 extends along one of the sides 24 of the container 22.

A linkage, which is described in more detail below, connects the cutter 70 to the lid 28 of the device 20 and moves the cutter 70 as the lid 28 is moved between a closed position shown in FIG. 4 and an open position shown in FIG. 5. When the lid is open, the cutter 70 is in an inactive position and shielded within a recess 80 defined between two side members 82 extending from a wall 24 of the device 20. In the inactive position, a fluid bag 42 in FIGS. 4 and 5 may be placed on the bag support 34 and is prevented from striking the blade 70 by the recess 80. The recess 80 also protects a user of the device 20 from inadvertent contact with the blade 72 of the cutter 70 when the lid 28 is in the open position.

Figure 4:
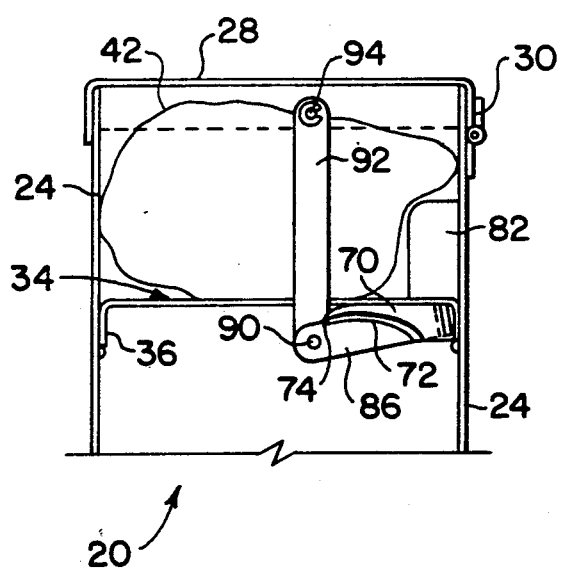
FIG. 4 is a sectional view on the line 4—4 in FIG. 2.
Figure 5:
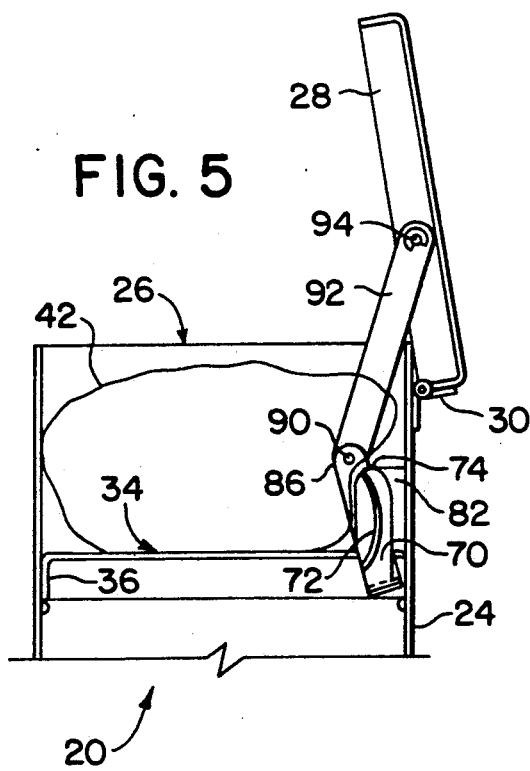
FIG. 5 is a view corresponding to FIG. 4 but showing the lid in an open position.

As the lid 28 is closed, the cutter 70 rotates anticlockwise as viewed in FIGS. 4 and 5 to eventually pass through a slot 84 in the bag support 34. It will be appreciated that as the cutter 70 rotates as described above, it will pierce the fluid bag 42 to allow fluid from the bag 42 to escape and flow past the screen 40 of bag support 34, be filtered by the screen and flow into a fluid reservoir fluidly connected to the device 20.

The linkage which connects the cutter 70 to the lid 28 includes a first lever arm 86 which extends radially from the shaft 76 adjacent an end 88 of the shaft 76. The first lever arm 86 is pivotally connected by a pin 90 to a second lever arm 92 which in turn is pivotally connected to the lid 28 by a further pin 94.

Figure 3:
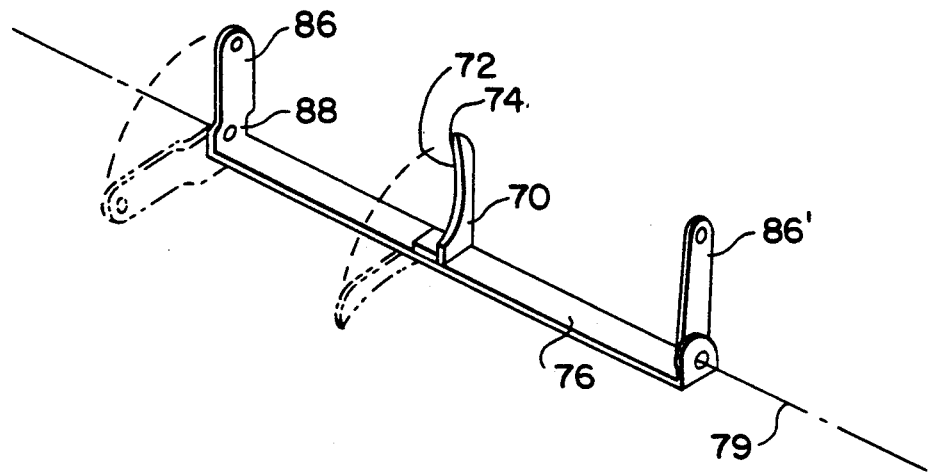
FIG. 3 is a perspective view of a cutter and part of a linkage used in the device of FIGS. 1 and 2.

A duplicate first lever arm 86' may be provided at the opposite end of the shaft 76 from the first lever arm 86 as shown in ghost outline in FIG. 3. The duplicate arm 86' may be connected to the lid 28 through a duplicate second lever arm (not shown) in a manner similar to that described above with respect to the first lever arm 86.

Preferably the first and second lever arms will be located adjacent a side 24 of the container 22 to avoid interference with the bag 42 as the lid 28 is closed.

Figure 6:
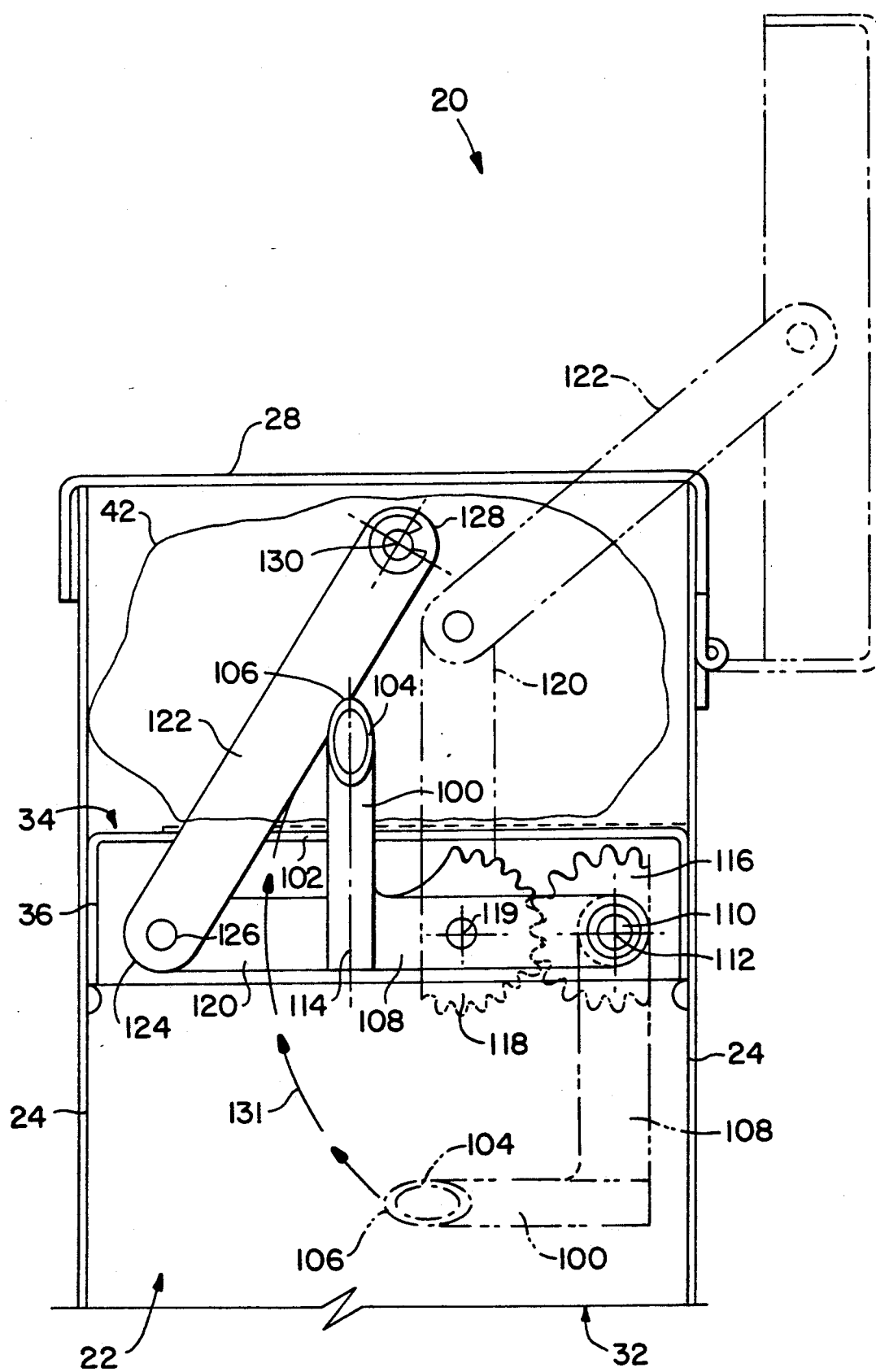
FIG. 6 is a view corresponding to FIGS. 4 and 5 of a device according to the present invention and shows an alternative embodiment of the linkage and cutter.

FIG. 6 shows an alternate embodiment of the device 20 in which a tubular cutter 100 is moved, by closing of the lid 28, from an inactive position below the bag support 34 through an opening 102 in the bag support 34 to pierce a fluid filled bag 42. Those components of the device 20 of FIG. 6 which are similar to the device 20 of FIGS. 1-5 are identified by like reference numerals and the above description applies.

The tubular cutter 100 in FIG. 6 is angled at an end 104 to define a sharpened leading edge 106 which pierces a bag and enables the remainder of the end 104 to pass through the side of the bag.

The tubular cutter 100 is supported by a blade support arm 108 which extends generally radially from a shaft 110 mounted below the bag support 34. The shaft 110 is rotatable about an axis 112 which is generally perpendicular to the plane of FIG. 6. The tubular cutter 100 has an axis 114 which is generally orthogonal to the axis 112 of the shaft 110.

The shaft 110 has a first gear 116 at one end for rotating the shaft 110. The gear 116 meshes with a second gear 118, mounted to a side wall 24 of the container 22 by mounting pin 119. A gear actuating lever 120 extends generally radially from the second gear 118. A rod 122 is pivotally connected at a first end 124 to the gear actuating lever 120 by a pin 126. The opposite end 128 of the rod 122 is pivotally connected to the lid 28 by a pin 130.

In use, as the lid 28 is closed, the lid 28 moves the rod 122 down and to the left as viewed in FIG. 6. The rod 122 in turn rotates the gear actuating lever 120 and the second gear 118 in an anti-clockwise direction as viewed in FIG. 6. The anti-clockwise movement of the second gear 118 causes the first gear 116 to rotate clockwise which in turn causes the shaft 110 and the blade support arm 108 to rotate clockwise as viewed in FIG. 6. The clockwise rotation of the blade support arm 108 causes the tubular cutter 100 to follow the path shown by the arrows 131 to move the tubular cutter 100 from the inactive position below the bag support 134 through the opening 102 to pierce a bag 42 supported on the bag support 34.

If desired, the shaft 110 may extend the full width of the container 22 and be provided with first and second gears, 116 and 118 respectively, a gear actuating lever 120 and a rod 122 at both ends. Preferably the gear actuating lever 120 and the rod 122 are located adjacent the side 24 of the container 22 to avoid interference with the bag as the lid 28 is closed.

An advantage of the device 20 of the present invention is that the upper part of the container 22 is dimensioned to receive a fluid bag 42 so that once the bag has been severed, fluid from the bag will flow into the reservoir without any requirement to fluidly seal the severed opening to prevent fluid from escaping out of the device. A further advantage of the device 20 is that the blade of the cutter is not exposed when the lid is in an open position. This reduces the possibility of injury to the user if the user places his or her hand within the container 22.

The above description should be interpreted in an illustrative rather than a restrictive sense. Variations to the present invention may be apparent to those skilled in the relevant art without departing from the spirit and scope of the present invention which is defined in the claims set out below. For example, if screening is not required, the bag support 34 may be constructed having larger and less frequent openings than suggested by the present figures. Furthermore, Although a rectangular container has been illustrated, other suitable shapes such as cylindrical, oval, etc. may be used.

I claim:

1. A device for transferring fluid from a bag placed therein into a fluid reservoir, said device comprising:
   a generally upstanding container having walls defining an interior space dimensioned to receive said bag, said container having a top opening and said container communicating fluidly with the interior of said reservoir;
   said walls including a fluid permeable bag support extending across said container below said top opening;
   a lid hingedly connected to said container for closing said top opening;
   a moveable cutter; and,
   a linkage connecting said lid to said cutter to move said cutter to an inactive position towards one of said walls as said lid is opened and to move said cutter through said interior space for said cutter to move through a face of said bag as said lid is closed to pierce said bag and allow fluid from said bag to escape from said bag and flow past said bag support into said fluid reservoir.

2. A device as claimed in claim 1 wherein:
   said cutter includes, a rotatable shaft mounted within said container and adjacent one of said walls thereof and a blade extending generally radially from an moveable with said shaft;
   said linkage includes a first lever arm extending generally radially from said shaft adjacent an end of said shaft and a second lever arm which is pivotally connected to said lid, said first and second lever arms being pivotally connected together and being adjacent one of said walls of said container to substantially avoid interference with said bag as said lid is closed.

3. A device as claimed in claim 2 wherein said bag support includes a screen and a slot for receiving said cutter and said cutter moves into said slot as said lid is closed.

4. A device as claimed in claim 3 wherein said container includes a recess for receiving said cutter in said inactive position and shielding said blade from contact when said lid is open.

5. A device as claimed in claim 2, 3 or 4 wherein said blade is curved and said cutter tapers to a point away from said rotatable shaft.

6. A device as claimed in claim 2, 3 or 4 wherein said linkage includes a third lever arm extending generally radially from said shaft adjacent the other end of said shaft and a fourth lever arm which is pivotally connected to said lid, said third and fourth lever being pivotally connected together.

7. A device as claimed in claim 2, 3 or 4, wherein:
said blade is curved and tapers to a point away from said shaft; and
said linkage includes a third lever arm extending generally radially from said shaft adjacent the other end of said shaft and a fourth lever arm which is pivotally connected to said lid, said third and fourth lever being pivotally connected together.

8. A device as claimed in claim 1 wherein:
said cutter includes a rotatable shaft mounted below said bag support, a blade support arm which extends generally radially from said shaft, and a blade supported by said blade support arm;
said linkage includes a first gear at an end of said rotatable shaft for rotating said shaft, a second gear meshing with said first gear, a gear actuating lever extending generally radially from said second gear and a rod pivotally connected at a first end to said gear actuating lever and pivotally connected at an opposite end to said lid;
so that in use, closing of said lid causes said rod to move said gear actuating lever to rotate said second gear in a first direction and said rotation of said second gear causes said first gear to rotate said shaft and said blade support arm in an opposite direction to move said blade from an inactive position below said bag support through an opening in said bag support to pierce said bag.

9. A device as claimed in claim 8 wherein:
said container has a generally rectangular cross-section;
said rod and said gear actuating lever are located adjacent a side of said container and said first and second gears are located below said bag support to avoid interference with said bag; and,
said bag support includes a screen for filtering said fluid as said fluid passes said bag support.

10. A device as claimed in claim 9 wherein:
said blade has a tubular body having an axis generally orthogonal to the axis of said rotatable shaft; and,
said blade has a sharpened leading edge facing away from said blade support arm, said leading edge being angled to cause one side of said leading edge to pierce said bag and allow the remainder of said edge to pass through said side of said bag.

11. A device as claimed in claim 8, 9 or 10 wherein said linkage includes a third gear at the other end of said shaft, a fourth gear meshing with said third gear, a lever extending generally radially from said fourth gear and a rod pivotally connected at one end to said lever and at the other end to said lid.

* * * * *